United States Patent [19]
Hoefelmayr et al.

[11] Patent Number: 5,245,946
[45] Date of Patent: Sep. 21, 1993

[54] METHOD AND APPARATUS FOR MEASURING A VALUE CORRESPONDING TO THE MASS OF A MILK SLUG, AND OF THE CORRESPONDING MILK FLOW

[75] Inventors: Tilman Hoefelmayr, Niederteufen, Switzerland; Jakob Maier, Jr., Tuerkheim, Fed. Rep. of Germany

[73] Assignee: Bio-Melktechnik Hoefelmayr & Co., Niederteufen, Switzerland

[21] Appl. No.: 858,169

[22] Filed: Mar. 26, 1992

[30] Foreign Application Priority Data

Mar. 27, 1991 [DE] Fed. Rep. of Germany ....... 4110146

[51] Int. Cl.$^5$ .............................................. A01J 5/00
[52] U.S. Cl. ................................. 119/14.15; 119/14.17
[58] Field of Search .............. 119/14.14, 14.15, 14.16, 119/14.17

[56] References Cited

U.S. PATENT DOCUMENTS

| | | | |
|---|---|---|---|
| 3,878,819 | 4/1975 | Harman | 119/14.14 X |
| 4,523,545 | 6/1985 | Kummer | 119/14.08 |
| 4,714,048 | 12/1987 | Jefferies et al. | 119/14.08 |
| 4,922,855 | 5/1990 | Tomizawa et al. | 119/14.15 |
| 5,116,119 | 5/1992 | Brayer | 119/14.15 X |

FOREIGN PATENT DOCUMENTS

| | | |
|---|---|---|
| 60-123732 | 2/1985 | Japan . |
| 2101739A | 1/1983 | United Kingdom . |
| 2124877A | 2/1984 | United Kingdom . |

*Primary Examiner*—Robert P. Swiatek
*Attorney, Agent, or Firm*—Flynn, Thiel, Boutell & Tanis

[57] ABSTRACT

A method and apparatus useful in the course of a milking operation in which the milk is intermittently conveyed in the form of separate milk slugs, to accurately determine the mass of the individual milk slugs and to thereby determine the actual milk flow rate. A measuring apparatus of this type is particularly suitable for use as an indicator operable to indicate a drop in the milk flow to below a predetermined value at the end of a milking cycle. An additional operation of measuring the travel speed of the individual milk slugs results in an extremely simple milk flow measuring device being obtained, which is capable of relatively accurately measuring the milk flow rate throughout the milking cycle.

22 Claims, 14 Drawing Sheets

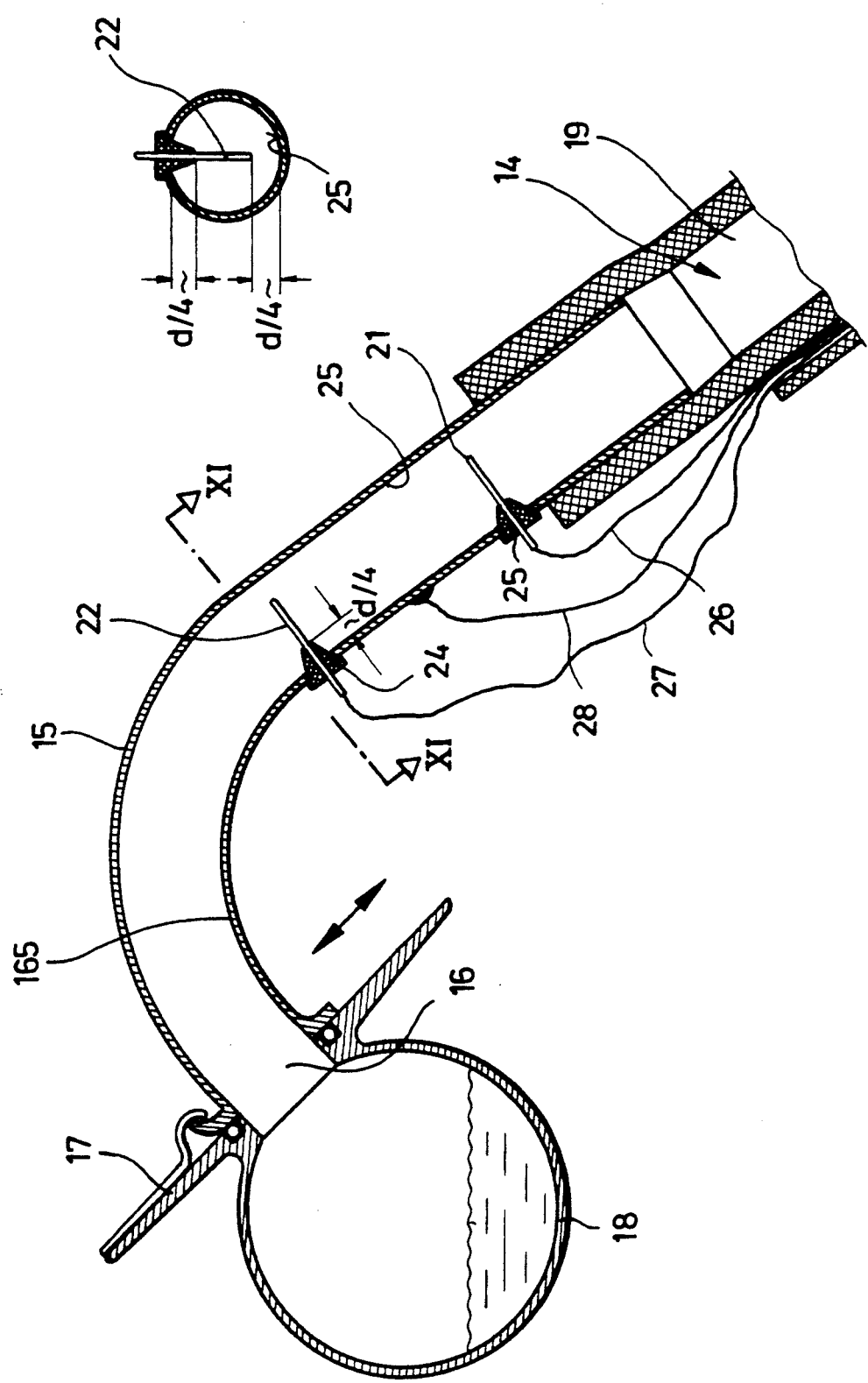

ived at the beginning of the milking operation, during the rising phase of the milk flow curve, it has to be expected that the vacuum conditions prevailing at the location of the milk flow indicator may be substantially different from those which prevail at the location of the udder. For this reason, an effective control of the operating vacuum in the milking installation in accordance with the actually occurring milk flow requires in

METHOD AND APPARATUS FOR MEASURING A VALUE CORRESPONDING TO THE MASS OF A MILK SLUG, AND OF THE CORRESPONDING MILK FLOW

FIELD OF THE INVENTION

The invention relates to a method and apparatus for measuring a value corresponding to the mass of a milk slug in the course of the intermittent transport of the extracted milk in the form of successive milk slug through at least one riser conduit section, and the resultant milk flow.

BACKGROUND OF THE INVENTION

The milking operation is of variable duration not only for individual cows, but also for any single cow. The milking time may thus typically vary between 3 and 10 minutes.

A dry milking process, i.e. the continued operation of a milking machine on an udder which does practically no longer yield any milk, is damaging to the teat tissue and highly dangerous with regard to the health of the udder. The milking appliance should therefore be taken off or deactivated immediately after cessation of the milk flow.

In accordance with advancing rationalization, it is nowadays customary to employ so-called milk flow indicators acting to automatically detect the end of the milking operation and to generate a corresponding signal, usually an electric or pneumatic signal. Depending on the degree of technical sophistication, the signal of the milk flow indicator results in the occurrence of one or more of the following responses:

1. An optical or acoustic signal to the operator,
2. the automatic interruption of the pulsation or reduction of the milking intensity,
3. the fully automatic removal of the milking appliance,
4. automatic initiation of a residual milking process, or
5. the control of the functional parameters of the milking machine in accordance with the actual milk flow.

The essential problems of a so-called milk flow indicator reside on the one hand in obtaining satisfactory accuracy of response, and on the other hand in the usually occurring vacuum losses. In the majority of cows, the so-called milk flow curve (milk volume per time unit) asymptotically approaches the zero flow line, although the natural configuration of the milk flow curve may be distorted by considerable variations due to the pulsation and the asynchronous intermittent milk transport.

By international agreement, the end of the milking operation is defined as the time at which the (natural) milk flow curve drops below the threshold value of 200 g/min. In the majority of cows, the intersection of the milk flow curve with this threshold value forms an extremely acute angle, so that even small measuring inaccuracies in this portion of the milk flow curve may result in considerable errors in determining the timing for the end of the milking operation.

These circumstances render the reliable determination of the actual end of the milking operation extremely difficult. To compensate for this unreliability factor, it is customary to impose a certain delay (typically about 30 sec.) between the appearance of the indicator signal and the actual initiation of the corresponding function, for instance the automatic removal of the milking appliance. In this manner it shall be ensured that the udder is in actual fact empty at the end of the milking operation, which is of considerable importance not only for economical reasons in terms of volume and fat content of the milk, but also in view of udder health. On the other hand, this delay may result in a prolongation of the prejudicial dry milking process, and in addition to a prolongation of the milking time, which leads to a lowering of operational productivity.

Milk flow indicators of the conventional type are moreover unsuitable in any case for obtaining any useful indication with regard to the magnitude of greater milk flow volumes (about 500 g/min and above), so that an efficient control of the functional parameters of the milking machine hither-to requires the employ of complicated milk volume measuring systems.

With regard to the problem of vacuum losses, it is to be kept in mind that the modern standard milking machine has to perform a twofold function: On the one hand, the vacuum is used to extract the milk from the udder by overcoming the resistance of the teat sphincter, and on the other hand the vacuum must be able to transport the thus extracted milk from the udder through the so-called long milk hose to the milk header or the measuring cup, whence the milk flows off by gravity. This transport of the milk to the milk header with the aid of the vacuum results in considerable hydrodynamic losses (flow losses), which increase in proportion to an increase of the milk flow. Inasmuch as many milking installations are designed as so-called high line installations, with the milk header installed overhead for technical and functional reasons, the extracted milk has to be conveyed upwards to a considerable height, i.e. to about 1.2 meters in the case of a milking box, and up to 2 meters in the case of a stable milking installation. The resulting additional hydrostatic losses (pressure losses) are likewise increasing in proportion to the milk flow.

Worldwide scientific endeavours directed over many years towards optimization of the functional parameters of milking machines notwithstanding, the cumulative flow and pressure losses continue to present a serious problem. This is because from the viewpoint of milking technology, the strength of the milking vacuum actually applied at the location of the udder is progressively reduced as the milk flow increases, i.e. at the very time when it would be most urgently required for efficient removal of the extracted milk, and that even in the case of a perfectly stabilized operating vacuum in the milk header (large cross-sectional passage areas, high-performance vacuum pump, accurately functioning vacuum control valve etc.). In order to be at all able to cope with the higher milk flow yields of modern cows, it is therefore indispensable to adjust the operating vacuum in conventional milking installations to a value considerably above that biologically required for the milk extraction. As a result thereof, however, the teat tissue is subjected to the unresticted prejudicially high operating vacuum as soon as the milk flow decreases during the milking operation, which results in a decrease of the vacuum losses, and particularly during the dry-milking phase, resulting in corresponding tissue damage and in the long run, to an increasingly slower milk extraction due to hardening of the teats as a biological counter-reaction of the organism.

Since a milk flow indicator can perform its function in the proper manner only when installed at a location downstream of the udder and upstream of the milk header—generally at the end of the long milk hose—it is evident from the above that any vacuum loss additionally caused by an indicator necessarily exerts a negative influence, which can moreover not be compensated, on the quality of the milking operation, with the corresponding consequences with regard to udder health and operational economy.

There has already become known a great variety of milk flow indicators.

The so-called chamber indicators comprise a closed accumulator vessel to be filled from above. Mounted within the vessel is an open-top standpipe communicating with a drain conduit therebelow and formed at the bottom level with a small calibrated drain opening permitting a continuous flow of 200 g/min into the drain conduit during the milking operation. The accumulator vessel houses a float, or optionally a pair of electrodes, for a conductive or capacitive measuring operation. It is also possible to povide a light barrier operable to supply a signal as soon as the liquid within the accumulator vessel has dropped to below a certain level, cf. for instance DE-OS 21 34 976 or U.S. Pat. No. 4,714,048.

Accumulator chambers basically permit an advantageous stabilization of the usually unstable milk flow signal to be achieved due to the integrating effect of the accumulator chamber volume. At the same time, however, the chamber volume results in the automatic occurrence of a delay, which may prove to lead to considerable disadvantages, inasmuch as the time of the delay is determined not only by the accumulator chamber volume, but also by the difference between the inflow into and outflow from the accumulator vessel, which in the case of a slowly decreasing milk flow involves the danger of extremely long delays which could in practice amount to a multiple of the actually intended value.

In indicators of the deviation chamber type, as disclosed for instance in DE-OS 22 00 141, the milk flows into the chamber from below, usually through an inflow pipe partially projecting into the chamber, internally of which the milk flow is divided. The milk flows off through an opening in the bottom or a lateral opening at the bottom level. A pair of electrodes is usually provided adjacent the bottom. In the course of the normal milking operation, the electrodes are intensively swept by the milk flow, so that the electric contact between the electrodes is closed. As the milk flow gradually decreases, the electrodes are swept thereby at increasing intervals, resulting in an increase of the electric resistance, until the electrodes fall completely dry and the contact is effectively interrupted.

An indicator of this type supplies a rather unreliable base signal of considerably variable strength. In addition, indicators of this type are highly sensitive to positioning irregularities, and suffer from the serious advantage of considerable vacuum losses in common with all chamber systems.

The so-called pipe indicators usually comprise a short pipe section with the milk flow usually passing therethrough from top to bottom. Since indicators of this type are usually also devoid of any flow-hampering internally mounted components, the resultant flow losses, and in particular vacuum losses, are relatively small. Known from GB-65 01 199 and U.S. Pat. No. 3,115,116 are ring electrode indicators comprising two electrically conductive pipe sections separated from one another by an insulating section in the milk flow direction. The electric resistance between the electrodes varies in proportion to the volume of the milk flow, these variations being measured. The accuracy of this measuring system is strongly affected by the varying electric conductivity of the milk of different cows, by the wide variations of the resistance values caused by the decreasing milk flow towards the end of the milking operation, and by the effect of periodical cleaning operations resulting in variations of the transfer resistance and the wettability characteristics of the pipe walls.

Known from U.S. Pat. No. 4,010,715 is a ring electrode indicator provided with electrodes on opposite sides of a conduit through which the liquid flow to be measured is directed. The application of a high-frequency AC voltage to these electrodes results in the generation of an electric current passing through the liquid and varying in accordance with the ionic conductivity of the liquid to be measured. A measuring apparatus of this type is unsuitable for measuring milk flows, since the conductivity of the milk varies from one cow to another, and is also affected by the fodder ingested by the cows.

In the case of a milk flow indicator known from U.S. Pat. No. 4,348,984, the measuring output signal is also affected by the electric conductivity of the milk flow to be measured. The milk flow measuring operation is carried out by causing the milk to flow through a coil energized by a high-frequency oscillator, resulting in the generation of an induction signal in the coil.

In photoelectric pipe indicators of the type as known for instance from EP 0 221 733, the measuring system usually comprises a short length of a smooth transparent pipe interposed in the long milk hose, usually in the vertical position, so that the milk flow passes therethrough from to bottom. A light source of a constant output intensity and a photosensor are disposed on opposite sides of the pipe. The milk flow is measured by sensing the decrease of the light refraction resulting from the decrease of the thickness of the milk film in the pipe as the milk flows therethrough. The obvious advantages of this system (no vacuum losses, insensitiveness to conductivity variations of the milk)are put into question by serious disadvantages. The accuracy of response is insatisfactory, because the light refraction is insufficient as a quantitative characteristic for accurately recognizing the thickness of the milk film. Even an extremely thin and no longer flowing milk film does still cause a considerable light absorption, with the resultant detection signal being scarcely different from that obtained from a wall flow of substantially greater thickness. This essential disadvantage is still aggravated by the fact that the measured value has to be derived from a discontinuously flowing milk and air mixture.

In "Agrartechnik" 20/2, February 1980, Trebus, Wehowsky and Schulze proposed to eliminate the difficulties arising from the presence of milk foam and variations of the milk fat content by preventing the flow of milk foam or the formation of a milk film of a high fat content on the pipe wall of the milk flow indicator towards the end of the milking operation by the provision of beads or ribs projecting inwards from the wall of the pipe upstream of the milk flow measuring location, to act on the milk film flowing along the pipe wall in the manner of a baffle so as to keep the part of the pipe wall adjacent the location of the measuring light beam essentially free of this film. The rather substantial inaccuracy of the operation of these milk flow indicators functioning on the photoelectric principle is evidenced by an investigation published in "Tierzucht" 42, (1988, page 11). according whereto the employ of milk flow indicators of this type results in the average milking time per cow being prolonged by 2.53 min, i.e. by about 50% as compared to the case of an accurate threshold value detection with the aid of a milk volume measuring device.

It is therefor an object of the present invention to provide a method an apparatus of the type defined in the introduction, by the employ of which it is possible to obtain a more accurate measurement of the milk slug mass and on the base thereof of the milk flow and, if need be, of a milk flow threshold value even in the lower milk flow range.

SUMMARY OF THE INVENTION

According to the invention, this object is attained by the provision that a value corresponding to the mass of each milk slug is determined by sensing the length of each milk slug within the riser conduit section at a location spaced from the interior wall of the riser conduit, and a mean milk flow value is derived therefrom by establishing a time average for successive milk slugs in consideration of a predetermined slug travel rate. As will be explained in more detail below, it has been unexpectedly found that the shape of the travelling milk slugs is subject to strong variations, particularly in reduced milk flow volumes. It is therefore essential to obtain an accurate measurement of a milk slug as a prerequisite for arriving at an acceptable conclusion with regard to the mass of a milk slug, and on the base thereof at a valid assessment of the milk flow, i.e. of the transported milk volume per time unit. It has similarly been found that in the case of a given milking appliance, the travel rates of individual milk slugs are substantially constant at low milk flow volumes, so that an initial calibration may be based on a predetermined slug travel rate.

If it is merely intended to generate a control signal in response to the milk flow dropping below or exceeding a predetermined value, particularly in the lower milk flow range, a specific embodiment attains the object of the invention by the provision that a value corresponding to the mass of each milk slug is determined by sensing the length of each milk slug within the riser conduit section at a location spaced from the interior wall of the riser conduit and a mean milk flow value is derived therefrom by establishing a time average for successive milk slugs, and that this milk flow value is compared to a pre-set second milk flow value obtained by calibration and constituting a threshold value. This permits the detection in a extremely simple manner and with relatively high accuracy of for instance the milk flow in response to which the milking operation should be terminated.

The average timing for a succession of milk slugs may be established either by determining the relation between the time required for the passage of each milk slug and the time interval between the passage of each slug and the succeeding one, by cumulatively adding the values corresponding to the lengths of successive milk slugs measured during a predetermined time span and dividing the sum by the number of slug passages during this time span and by the length of the time span, or by establishing a so-called sliding mean value for a number of successive slugs.

The accuracy of the measuring results of the milk flow particularly for low milk flow rates, but also of the measuring results of the milk flow over a wide range of milk flow rates, can be considerably improved by measuring the travelling speed of the milk slugs, a value corresponding to the mass of each milk slug is determined by sensing the length of each milk slug within the riser conduit section at a location spaced from the interior wall of the riser conduit, a mean value is established therefrom by establishing a time average for successive milk slugs, and the magnitude of the milk flow is derived therefrom in consideration of the milk slug travel rate. A method of this kind is suitable not only for determining the milk flow threshold value at the end of the milking cycle, but also for measuring the milk flow with relatively high accuracy throughout the milking operation.

It is of course not absolutely necessary to explicitly measure the travelling rate of a given milk slug. A substantially equivalent measurement of the milk flow is obtained by measuring the time required by each milk slug for travelling a predetermined distance, the thus obtained time value being subsequently used for correcting the mean milk flow value determined under the assumption of a predetermined slug travel rate, to thereby determine the actual milk flow.

When the milk flow measuring apparatus is to be employed merely as a milk flow indicator, the method is suitably performed in such a manner that a control signal is generated in reponse to the milk flow dropping to below a determined value.

The invention further provides an apparatus operable to measure a value corresponding to the mass of a milk slug in the course of the intermittent transport of extracted milk in the form of successive milk slugs through at least one riser conduit section. This is accomplished according to the invention by the provision in the riser conduit section within said riser conduit of a measuring section extending transversely of the milk slug transport direction, either between two measuring points disposed opposite one another at respective locations spaced from the interior wall of the riser conduit, or between a measuring point disposed at a location spaced from the interior wall of the riser conduit and the interior wall itself of the riser conduit, means being also provided for measuring the time required for the milk slug to pass through the measuring section. It is only this accurate determination of the mass of each milk slug which subsequently permits the actual milk flow to be more accurately measured.

Advantageous embodiments and arrangement of the measuring point or electrodes, respectively, will become evident from the subclaims.

The invention thus provides a measuring apparatus of advantageously simple construction and functionality, which is on the one hand operable to relatively accurately determine a milk flow threshold value, or even to measure the actual milk flow, and which on the other hand causes practically negligible vacuum losses.

Proceeding from the apparatus for measuring the mass of a milk slug, the corresponding apparatus for measuring the milk flow may be obtained by the provision of a component operable to establish a mean time value by averaging the time values for successive milk slugs, and to determined therefrom a milk flow value in consideration of the cross-sectional area of the riser conduit and a predetermined milk slug travel speed. The thus obtained milk flow value is preferably applied to a threshold value indicator acting to generate a control signal in response to the milk flow value dropping to below a pre-set threshold value.

In a simplified embodiment of the invention, the apparatus may merely be provided with a component for establishing a time average from the time values measured for successive milk, and a comparator acting to compare the output signal obtained from this component to a pre-set second signal value constituting a threshold value obtained by calibration.

To permit the milk flow value to be determined even more accurately, and for measuring the milk flow throughout the milking operation, a second measuring section extending transversely of the milk slug transport direction is preferably provided within the riser conduit section at a location spaced from the first measuring section in the longitudinal direction of the riser conduit, and for determining the travel speed of each milk slug, a component may be provided which acts to measure the time difference between the passages of each milk slug through the first and second measuring sections.

The second measuring section may be of a construction as described above with reference to the first measuring section, or a construction similar to that of the first measuring section.

In a preferred embodiment of the apparatus, a milk backflow preventer may be provided immediately downstream of the measuring apparatus in the transport direction of the slugs. The backflow preventer may for instance be provided in the form of a non-return valve, or in the form of a pipe elbow opening into the milk header. The apparatus according to the invention may also be designed to separately measure the milk flows originating from the individual teats, when a so-called quadruple milking hose is employed, in which case a measuring apparatus according to the invention may be installed in each of the four milk conduits.

BRIEF DESCRIPTION OF THE DRAWINGS

Preferred embodiments of the invention shall now be described by way of example with reference to the accompanying drawings, wherein:

FIG. 10 shows a longitudinally sectioned view of the riser conduit section of the long milk hose adjacent its opening into the milk header, FIG. 11 shows a sectional view taken along the line XI—XI in FIG. 10.

DETAILED DESCRIPTION

Figure 20:
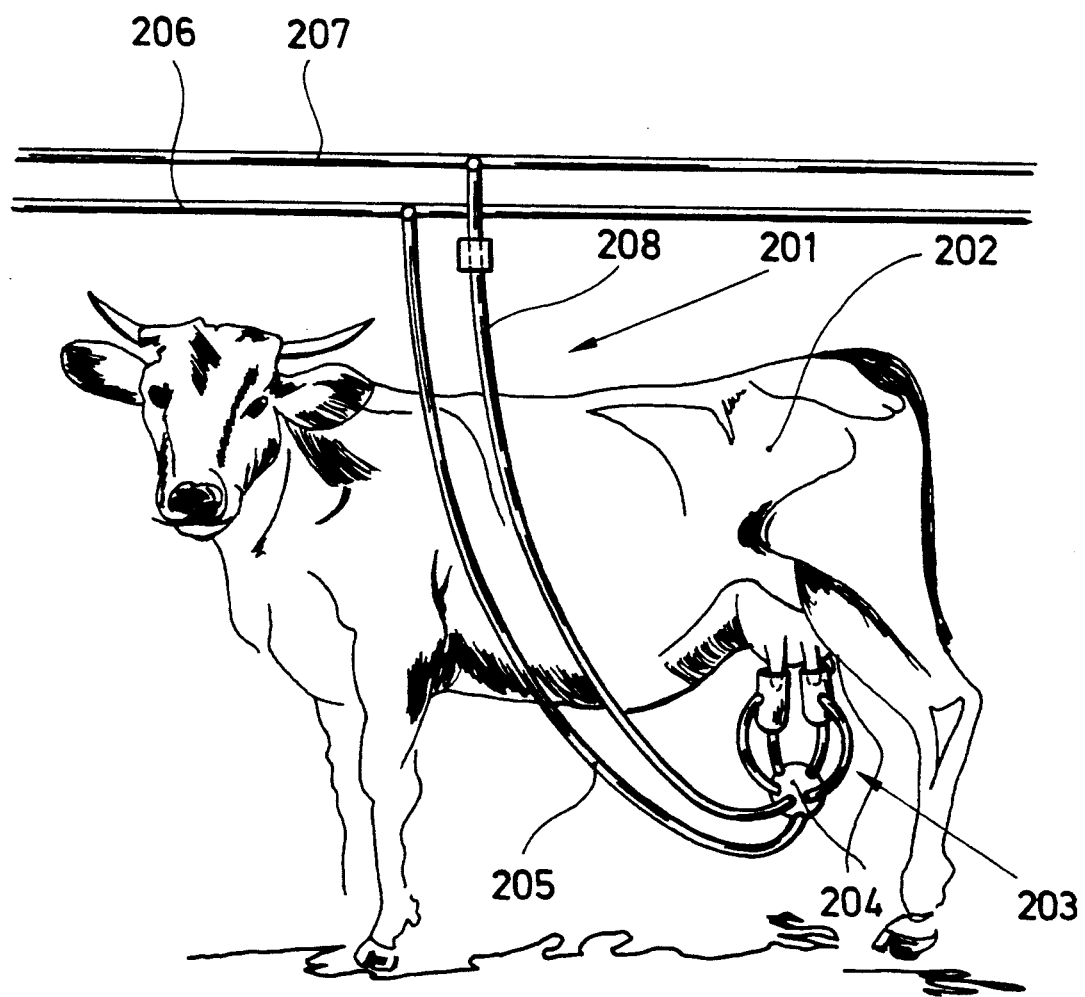
FIG. 20 shows a diagrammatic illustration of a milking installation including an overhead milk header and a riser conduit leading thereto from a milking appliance.

Shown in FIG. 20 is a milking installation generally indicated at 201 and installed at a milking stand for a cow 202. The milk extracted from the cow's udder by means of a suction cup assembly 203 is collected in a collector head 204 and removed therefrom by vacuum action through a common riser conduit 205 opening into an overhead milk removal conduit or milk header 206. A further conduit 207 installed in parallel to milk header 206 communicates with a pulsator operable to alternately apply a vacuum and atmospheric pressure to suction cup assembly 203 through an additional conduit 208. Riser conduit 205 is usually provided in the form of a flexible pipe, preferably a hose, which normally assumes a sagging bight configuration.

Figure 5:
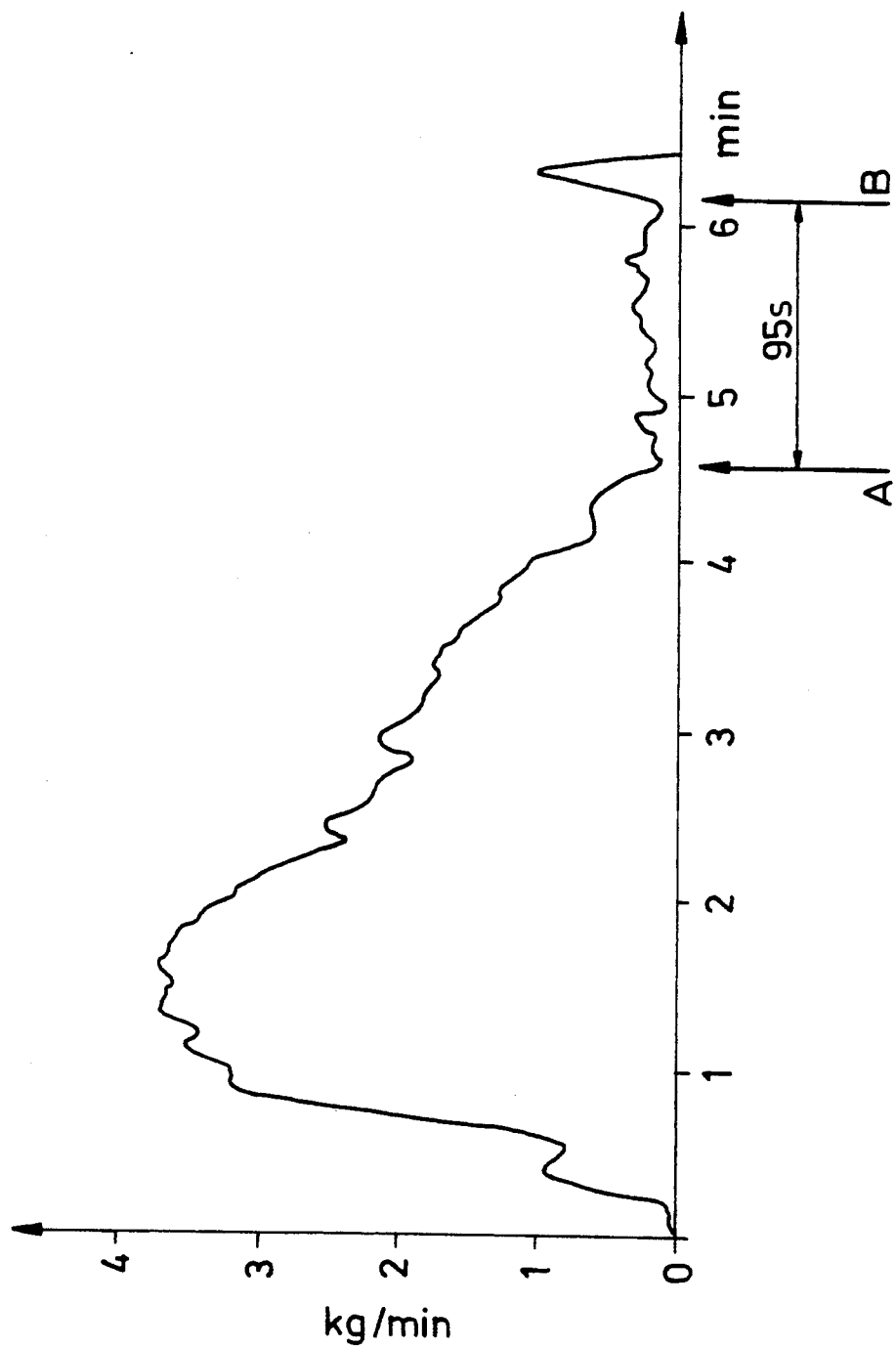
FIG. 5 shows a diagram of the measured milk flow in kg/min
Figure 6:
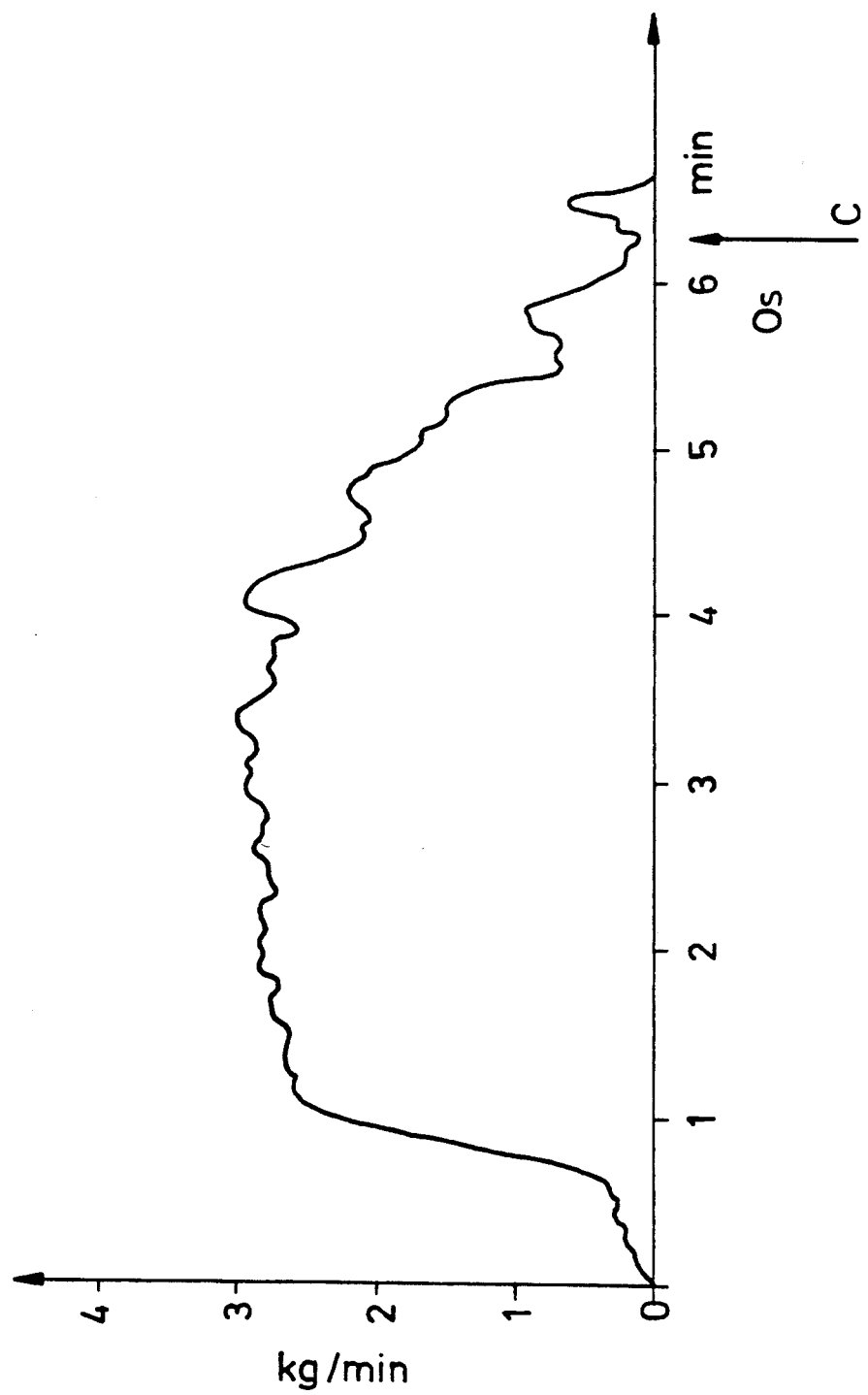
FIG. 6 shows another diagram of the measured milk flow as expressed in kg/min.

FIGS. 5 and 6 show typical milk flow curves illustrative of possible milking operations. The milk flow is projected on the ordinates in kg/min, while the time is projected on the abscissae in minutes. In FIG. 5, the milk flow initially shows an increase up to a maximum after about 1.6 min, whereupon it shows a steady decrease, until it drops for the first time to below the usual threshold value of 0.2 kg/min after about 4½ min. From this instant, designated A, to the instant designated B, that is, during a period of about 95 seconds, the measured milk flow varies within a range close to the threshold value of 0.2 kg/min. Subsequent to the instant B, the milk flow curve rises again to a lower peak, corresponding to the so-called finish yield recovered at the end of the milking operation by manual or automatic intervention. The thus measured milk flow curve is thus indicative of the occurrence of the so-called dry milking operation for a period of 95 seconds due to the fact that the milking vacuum had not been shut off at the instant A.

In the case of the milk flow curve shown in FIG. 6, the threshold value of 0.2 kg/min is reached for the first time after about 6.2 min at the instant designated C. Inasmuch as in this case the finish yield follows immediately upon this instant, the dry milking period had been practically equal to zero seconds in this milking operation. The two different milk flow curves are intended to demonstrate that the behaviour of the milk flow over time shows considerable variations, so that the detection of the actual end of the milking operation meets with varying difficulties. In the case of FIG. 6, the end of the milking operation was detected by a very observant and experienced operator, while in the case of FIG. 5, the end of the milking operation was signalled by a conventional indicator. For better understanding of the difficulties affecting the determination of the milk flow at low milk flow rates, and for better understanding of the principle of individually measuring successive milk slugs on which the invention is based, it may be helpful to have a closer look at the actual milk transport operation.

In a modern standard milking machine, so-called transport air is (continuously or periodically) supplied to the milk collector head or to the suction cups, for thereby reducing extremely high cyclic vacuum variations and hydrostatic vacuum losses. The amount thus supplied is about 8 l/min of atmospheric air, corresponding to about 16 l/min expanded air. This air volume is selected to meet the requirements for optimum transport of the maximum milk flow to be expected (typically about 6 l/min).

In modern milking machines, the milk and air flows are no longer intermixed to form a continuously flowing homogenous foam flow—as by blowing finely distributed air directly into the milk flow—because this obsolete technique strongly increases the danger of structural damage of the milk and additionally results in increased vacuum losses. By contrast, the transport of the milk through the long milk hose in modern standard machinery is carried out in the form of milk slugs or batches separated from one another by "air slugs" (sequential milk/air separation). The creation of this slug flow is not, however, to be primarily ascribed to the intermittent milk extraction from the teats caused by the pulsating milking process. The flow mechanics of this process rather present themselves as follows:

In any milking machine installation, the flow conduit from the udder to the milk header includes a lowermost point. This lowermost point is usually located adjacent the collector head outlet, or in a section of the long milk hose immediately downstream of the collector head.

For reasons of vacuum technology, the cross-sectional areas within the milking appliance are usually dimensioned so that they are not completely filled by the extracted milk. This implies that the milk can flow from the udder to this lowermost point by the action of gravity, while the transport air supplied to the milking appliance can flow over the milk without being hampered. In this downwards leading conduit section, milk and air thus flow independently from one another in accordance with their own physical laws (layered flow). The freely flowing milk collects at the lowermost point as in a siphon. As long as the transport air is capable of flowing freely over the accumulating milk, the latter remains within the siphon. Only after the free flow of the transport air through the siphon is shut off by the collected milk, the air continuing to flow into the milking appliance can no longer be evacuated by the action of the operating vacuum, as a result of which a pressure rise, i.e. a vacuum reduction, is created in the milking appliance upstream of the shut-off location. This results in the establishment of a corresponding pressure differential over the shut-off location.

In response to this pressure differential, the milk collected in the siphon in sealing contact with its walls is progressively pushed into the riser leg of the siphon, resulting in the creation of a corresponding hydrostatic counterpressure by the thus formed milk slug. As soon as the pressure differential acting on the milk slug overcomes the thus created hydrostatic pressure including the wall friction of the slug, the latter is set in motion and accelerated towards the end of the long milk hose. This discontinuous batchwise removal of the milk from the siphon is repeated whenever the siphon is shut off by the continuing milk flow.

If the milk slugs forming in the siphon were always of the same size, the magnitude of the milk flow could be readily derived from the size of the milk slugs and the time sequence of these slugs. This assumption does not, however, hold true for various reasons. It has in particular been found that the originally formed slugs tend to partially dissolve in the course of their transport through the milk hose. This may be assumed to result from the fact, that on its way through the long milk hose, and in particular in the riser section thereof, the transport air supplied via the milking appliance and exerting its pressure on the milk slug tends to progressively penetrate the milk slug as it acts to push it along the conduit.

Figure 9:
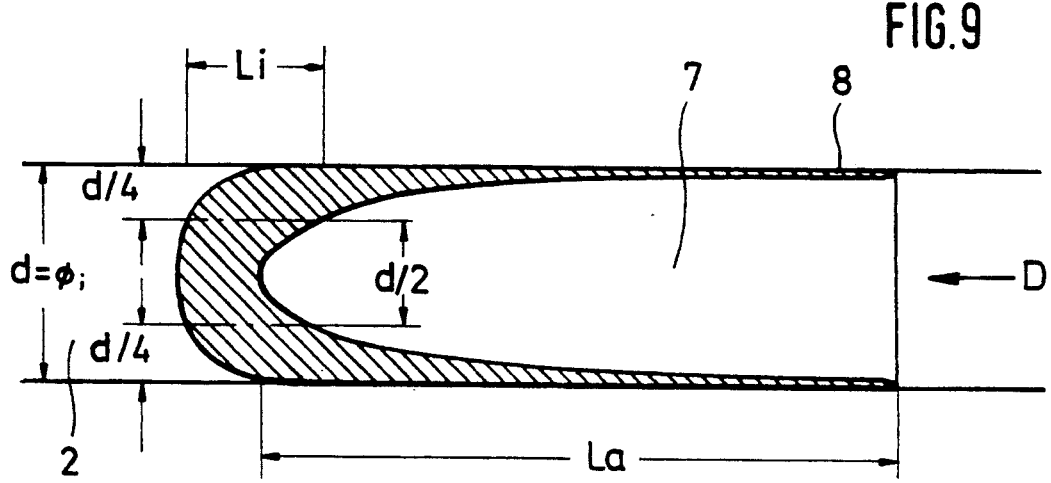
FIGS. 7 to 9 show longitudinal sectioned views of different shapes of milk slugs.
Figure 8:
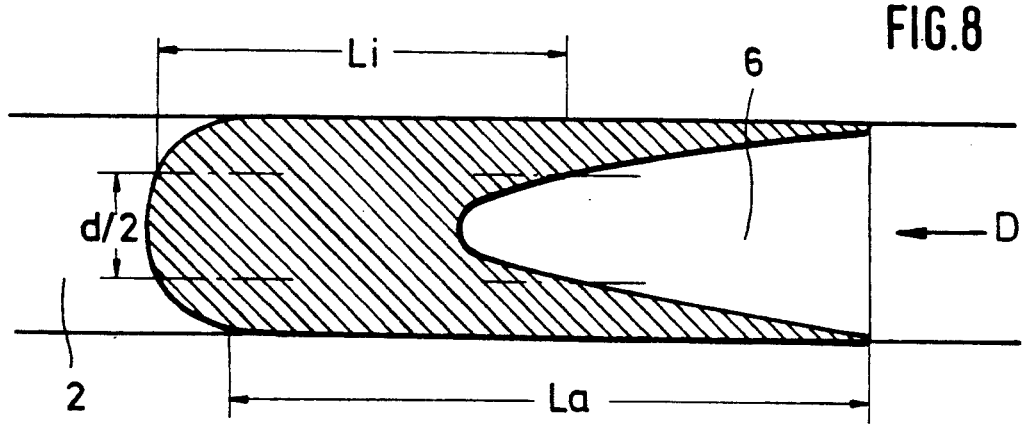
Figure 7:
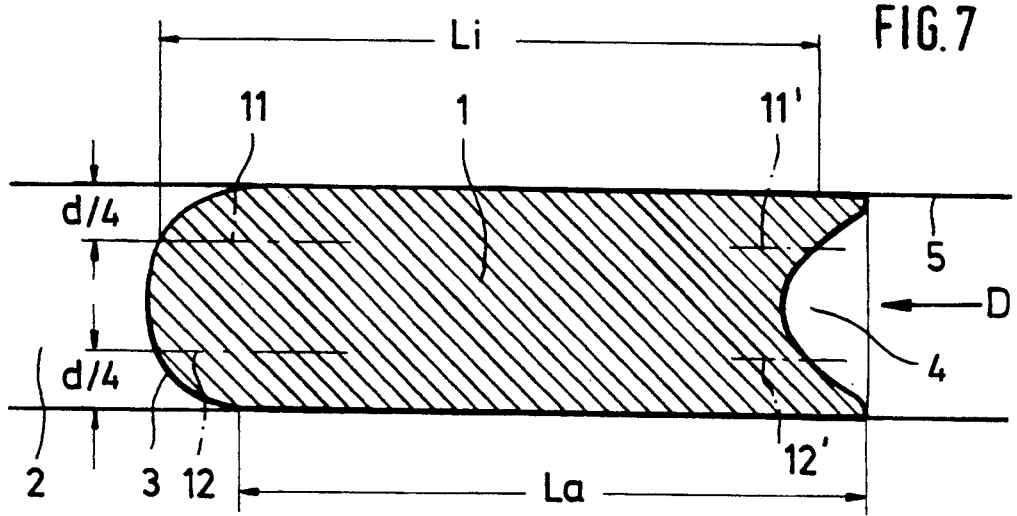

This initial deformation of a slug 1 in the long milk hose 2 is illustrated in FIG. 7, the milk slug 1 shown being pushed along in the transport direction D. While the leading end 3 of slug 1 exhibits a slight bulge, a cavity starts to form at the center 4 of its trailing end. This results from the fact that the liquid forming the slug is gradually displaced from the cross-sectional center towards the wall 5 of the conduit by the pressure acting thereon from the rear. The size of this cavity is steadily increasing during transport, assuming the shape indicated at 6 in FIG. 8, while the slug depicted in FIG. 9 is already formed with the cavity 7 at its cross-sectional center. The length of the slug as measured on the longitudinal center axis of the milk hose thus exhibits a steady decrease from FIG. 7 to FIG. 9, the trailing end portion of the slug finally consisting merely of a layer of rearwards decreasing thickness adhering to the interior wall of long milk hose 2. While the slug's initial shape resembles that of a solid cylinder, the slug is thus deformed in the course of its transport to the configuration of a shell case having a solid bottom portion and an outer wall of progressively diminishing thickness. This has the effect that the slug's length exhibits a progressive increase, although its mass remains unchanged. Inversely this implies that slugs of equal length may have a widely varying mass, depending on the degree of cavity formation. For reasons of illustration technique, FIGS. 7, 8 and 9 do not show slugs of identical initial mass, as the illustration of the increasing length of a slug would meet with prohibitive difficulties. FIGS. 7 to 9 are solely intended to show that slugs of identical length La as measured externally may have considerably different masses.

In milking machines of the type presently employed, it is customary to provide long milk hoses having an internal diameter $\phi_i = d$ between 13 and 18 mm. Taking this diameter into account, it has been found that, wide variations of the slug configuration notwithstanding, an acceptable approximation for determining the total mass of a slug can be obtained by measuring the length of the slugs in the transport direction at a location spaced by about d/4 from the interior wall of the long milk hose. This yields acceptable values in the case of an internal diameter of about 16 mm. In the case of conduits having different internal diameters, it may be necessary to slightly shift the measuring location within the conduit in order to obtain a value corresponding to the total mass of a milk slug.

For better understanding, FIG. 7 shows two broken lines 11, 11' and 12, 12' extending parallel to the interior wall of the long milk hose 5 and spaced therefrom by a respective distance d/4. The spacing between the intersections of lines 11, 11' and 12, 12' with the respective contours of milk slug 1 at its leading and trailing ends, respectively, corresponds to a length designated Li, that is, the length of slug 1 as measured along lines 11, 11' and 12, 12' is Li. Multiplication of this length with the cross-sectional area of milk hose 5 gives an acceptable value for the actual mass of the slug. In FIGS. 8 and 9, the length Li is in a similar manner determined along lines extending at a distance d/4 from the interior wall of the long milk hose. These simplified illustrations thus show that the values Li differ considerably from the exteriorly visible overall length La of a slug due to the progressive formation of the cavity in its trailing end.

The length of the slugs may thus generally be measured by providing a measuring section extending transversely of the direction of slug travel, and by detecting the passage of each milk slug between a measuring point located on line 11 or 12 and the interior conduit wall, or between two measuring points approximately on lines 11 and 12, respectively.

Different embodiments of measuring sections for this purpose shall now be descussed in detail.

FIGS. 10 and 11 show the upper end of a long milk hose 14 connected to a metal elbow end piece 15. The end 16 of elbow 15 is adapted to mate with a connector 17 provided on an overhead milk header 18 usually provided to convey all of the extracted milk. On its other side, elbow 15 is connected to the end portion 19 of long milk hose 14, which is usually made of rubber or a plastic material. In the illustrated example, two measuring electrodes 21 and 22 are provided within elbow 15. Electrodes 21 and 22 are mounted in the wall of elbow 15 by means of electrically insulating sealing plugs 23 and 24, respectively, so as to project into the interior of the conduit. Both electrodes are made in the form of thin rods or wires extending substantially perpendicular to the longitudinal axis of the conduit. The tips of electrodes 21 and 22 projecting into the conduit are spaced by a distance d/4 from the opposite part of the interior conduit wall 25. On the other hand, insulation plugs 23 and 24 enclose electrodes 21 and 22, respectively, up to a distance d/4 from the interior wall 25. Electrical conductors 26, 27 are provided to connect each electrode 21 and 22, respectively, to associated voltage sources. The counter-electrode cooperating with electrodes 21 and 22 is in the present example formed by the metal elbow 15, which may for instance be grounded by a conductor 28.

The embodiment depicted in FIGS. 10 and 11 is thus provided with two measuring sections, one between electrode 21 and the wall of elbow 15, and the other between electrode 22 and the wall, although a single measuring section would be sufficient for determining the length of a slug. This is because, if it is assumed that in the presence of weak milk flows, i.e. in the range of the milk flow curve in which the milk flow approaches the threshold value of 0.2 kg/min, the traveling speed of the milk slugs is substantially invariable, this assumption having been substantially confirmed by appropriate measurements, the travel speed would have to be measured just once and can be entered into the measuring circuit as a constant value. In this case the length of a milk slug can be determined by simply measuring the time required for the slug to pass the measuring section. Thus any of electrodes 21 or 22 can be used for this measuring operation.

If on the other hand it is desired to obtain more accurate measurements or to perform the measuring operation at varying intervals in the course of the milking operation, the calculation of the milk slug length additionally requires the traveling speed of the milk slug to be determined. To this purpose the embodiment of FIG. 10 is provided with two electrodes spaced from one another in the longitudinal direction of the milk hose. The operation of measuring the time required by the milk slug to travel over the distance between the two electrodes thus permits the speed of travel of the milk slug to be additionally determined in aid of accurately determining the length of each milk slug.

Figure 12:
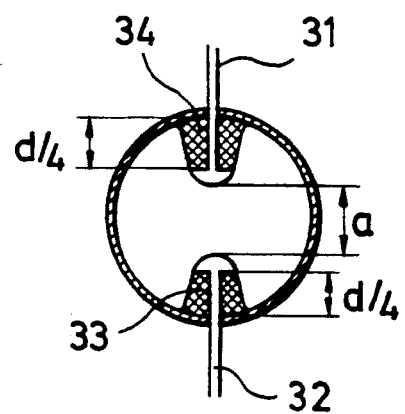
FIG. 12 shows a diagrammatic cross-sectional illustration of the construction of a measuring section.

FIG. 12 shows a measuring section functioning on the electric conductivity detection principle, in which case the conduit 30 wherethrough the milk slug is directed may be made either of an insulating material, such as a plastic, or of an electrically conductive material, i.e. a metal. Eletrodes 31 and 32 extend through the wall of conduit 30 at opposite locations, In the case of a conduit made of an electrically insulating material without the need of any additional insulation. The two electrodes are formed as rods each with a semispherical end portion of somewhat enlarged diameter. The electrodes are mounted in such a manner that the rear face of their semispherical end portions facing the conduit wall is spaced therefrom by a distance of about d/4. Accurately over this distance the electrodes are enclosed in an electrically insulating material 33, 34, which has of course to be compatible with the milk. The tips of electrodes 31 and 32 are thus spaced from one another by a distance a somewhat smaller than d/2.

Figure 13:
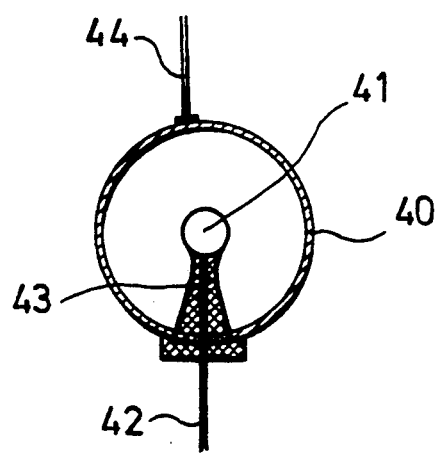
FIG. 13 shows a diagrammatic cross-sectional illustration of another embodiment of a measuring section.

FIG. 13 illustrates a measuring section functioning on the capacitive measuring principle. Disposed on the longitudinal axis of the conduit 40 and coaxial therewith is a cylindrical sleeve 41 having its two longitudinally spaced ends closed by respective semisphreical end walls. The total length of sleeve 41 may for instance correspond to twice the conduit diameter. In the transverse direction, the outer diameter of sleeve 41 may be smaller than or equal to d/2, d denoting the interior diameter of conduit 40. An electric conductor 42 leads from sleeve 41 to the exterior of conduit 40, conductor 42 passing through the wall of conduit 40 in electrically insulating manner and embedded in an insulating mounting fixture 43 within conduit 40. Insulating mounting fixture 43 at the same time acts to retain sleeve 41 in position. Sleeve 41 acts as an electrode disposed in opposition to the interior wall of conduit 40 made of an electrically conductive material and acting as a second electrode, conduit 40 being connected to an electric conductor 44.

Figure 14:
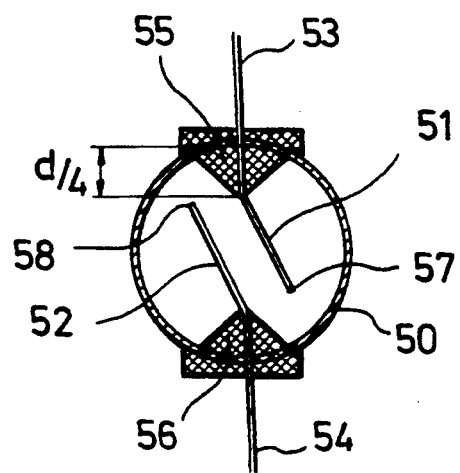
FIG. 14 shows a diagrammatic cross-sectional illustration still another embodiment of a measuring section.

Shown in FIG. 14 is a further embodiment of a measuring section functioning on the capacitive measuring principle. Disposed within conduit 50 at locations spaced from one another and substantially parallel to the longitudinal axis of conduit 50 are two plate electrodes 51, 52 connected to respective electric conductors 53, 54 extending through the wall of conduit 50. Internally of conduit 50, conductors 53 and 54 are enclosed in an electrically insulating material 55, 56 up to a distance d/4 from the interior wall surface. The arrangement and length of plate electrodes 51, 52 are determined to ensure that their free edges 57, 58 are uniformly spaced by a distance $\geq d/4$.

Figure 15:
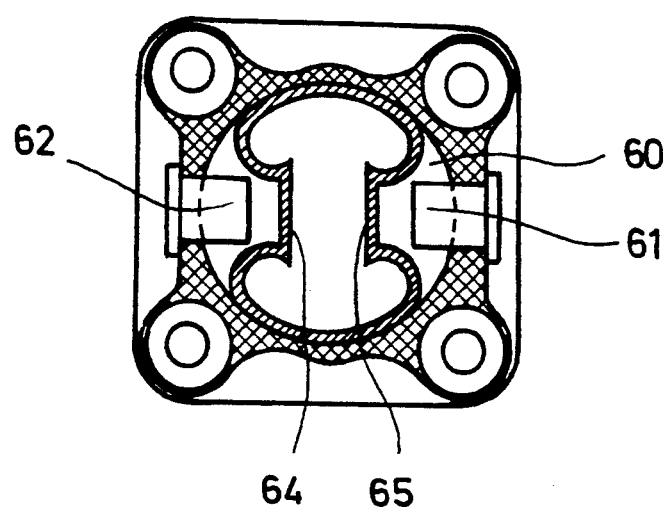
FIG. 15 shows a diagrammatic cross-sectional illustration of a still further embodiment of a measuring section functioning on the optical measuring principle.

FIG. 15 shows a measuring section functioning on the optical detection principle. Projecting into a conduit 60 from opposite sides are a light source, in the form for instance of a light-emitting diode 61, and a photoresistor 62. The mutually facing ends of light source 61 and photoresistor 62 may be covered by translucent walls 63, 64 formed for instance as part of an inner conduit. Each of walls 63 and 64 is spaced from the interior wall of conduit 60 by a distance of about d/4, and the distance of the walls from one another is ≤d/2.

Figure 16:
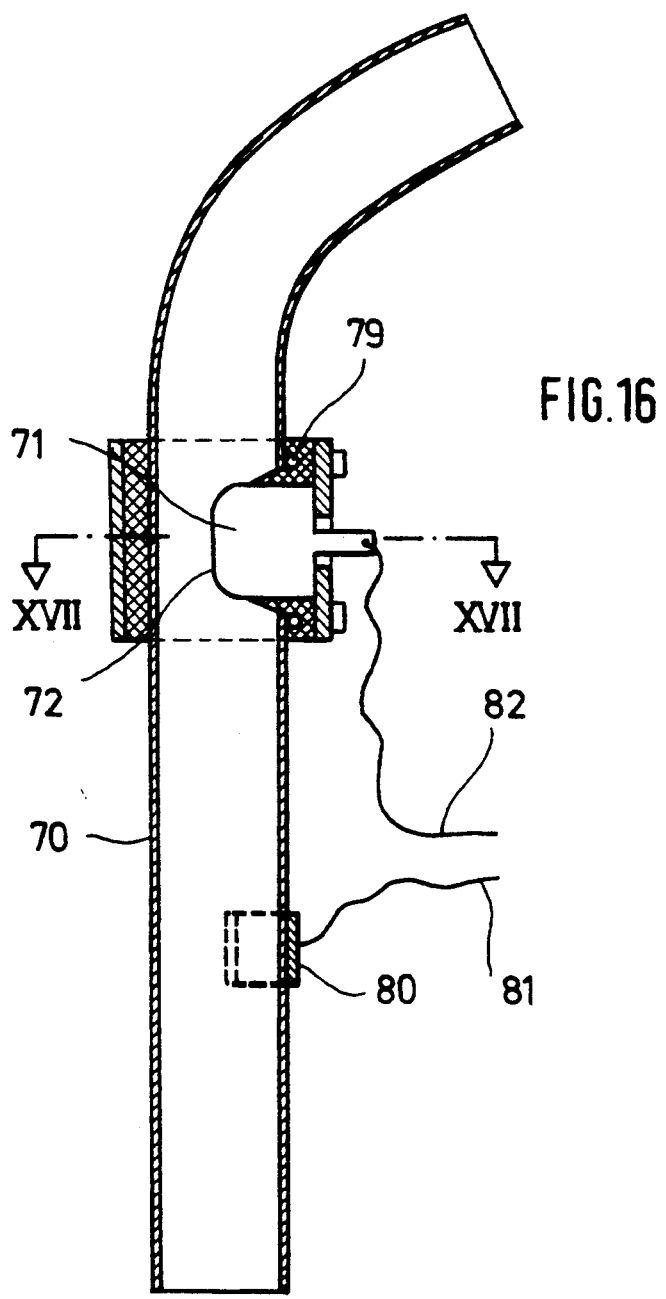
FIG. 16 shows a diagrammatic longitudinally sectioned view of a riser conduit section including a measuring section.
Figure 17:
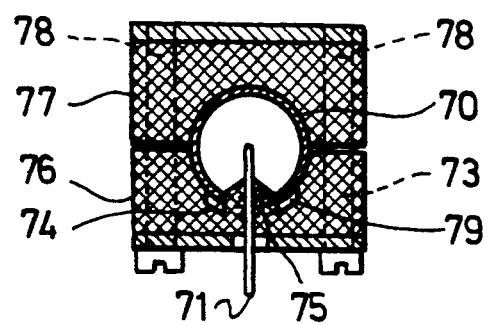
FIG. 17 shows a sectional view taken along the line XVII—XVII in FIG. 16.

Shown in FIGS. 16 and 17 is an embodiment in which an electrode is provided within a conduit 70 in the form of a relatively thin metal sheet 71. Electrode 71 extends into conduit 70 to a location adjacent the center thereof, with its free edge 72 extending substantially parallel to the longitudinal axis of conduit 70. On its opposite sides electrode 71 is retained by an insulating mounting fixture 73 covering and thus electrically insulating the electrode up to a distance of about d/4 from the interior wall of conduit 70. The wall of conduit 70 is formed with an aperture 74 for a part 75 of mounting fixture 73 to extend therethrough. Mounting fixture 73 itself is composed of two blocks 76, 77 clamping conduit 70 between them with the aid of bolts 78 extending therethrough. An O-ring 79 surrounding aperture 74 is provided to form a seal between block 76 and the outer surface of conduit 70. In this embodiment, conduit 70 is made of an electrically conductive material, so that its interior wall can act as the counter-electrode. To this purpose conduit 70 is provided with a ground connection terminal 80 on its outer face. Electric conductors 81, 82 are provided to connect ground connection terminal 80 and electrode 71, respectively, to associated measuring instruments not shown in the drawing. The illustrated measuring section between edge 72 of electrode 71 and the opposite interior wall of conduit 70 preferably functions by making use of the electric conductivity of the milk, it being emphasized at this point that it is not the magnitude of the milk's conductivity that is being measured, the measuring section as shown merely making use of the fact that the milk acts to establish an electrically conductive connection between electrode 71 and the wall of conduit 70, that is, in the course of a measuring operation it is solely detected whether or not such a connection exists.

Figure 2:
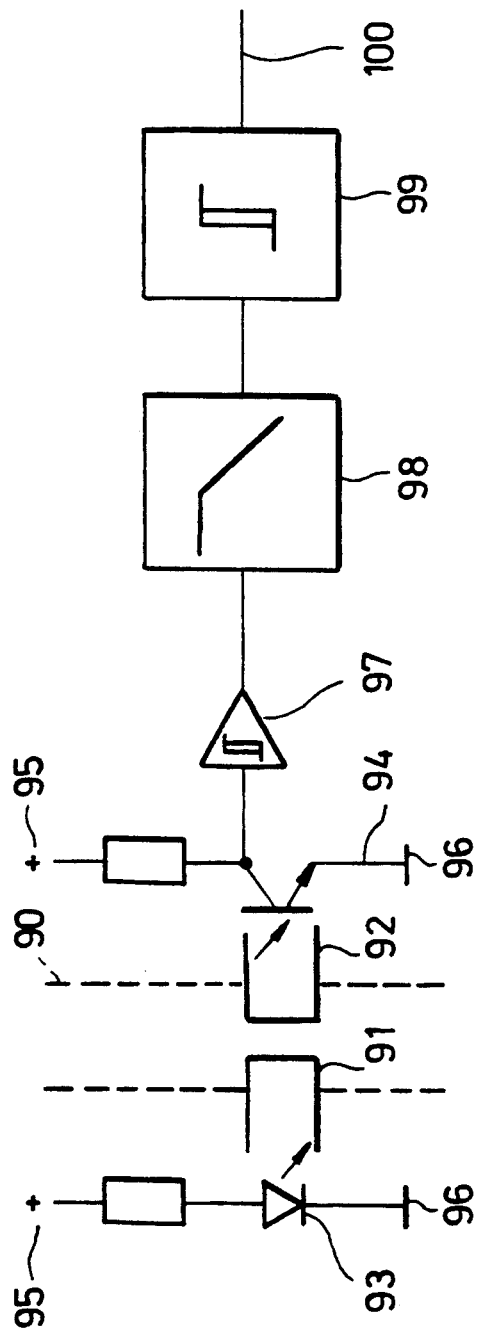
FIG. 2 shows a diagrammatic illustration of a milk flow indicator according to the invention functioning on the optical measuring principle.

FIG. 2 illustrates an embodiment of a measuring circuit for use in combination with a measuring section of the type described above to form an indicator acting to generate a control signal in response to the milk flow dropping to below a threshold value of about 0.2 kg/min at the end of a milking cycle. Diagrammatically represented in FIG. 2 is a riser conduit section 90. Corresponding to the embodiment shown in FIG. 15, a measuring section is formed between two members 91 and 92 projecting into riser conduit 90 and containing respectively a light-emitting diode 93 and a photo-transistor 94. The anode of LED 93 is connected to a voltage source 95 through a resistor R, its cathode being connected to ground as at 96. Phototransistor 94 has its collector connected to voltage source 95 through another resistor, and its emitter to ground as at 96. The output of its collector is applied to a Schmitt trigger 97, the output of which again is applied to a low-pass filter 98. The output of low-pass 98 is applied to a further Schmitt trigger 99 acting to generate a control signal at its output 100 in response to the milk flow dropping to below a pre-set minimum flow.

OPERATION

The shown circuit operates as follows:

LED 93 is continuously energized to emit a light beam directed onto phototransistor 94 through the measuring section to thereby cause a corresponding current to flow in phototransistor 94. As soon as the leading end of a milk slug enters the measuring section, part of the light is absorbed, so that the current flowing in transistor 94 is reduced. In response to this current dropping to below a predetermined threshold value Schmitt trigger 97 acts to generate a first flank of a square pulse. As the trailing end of the milk slug leaves the measuring section, the current flowing in the phototransistor is again increased, causing the Schmitt trigger to generate the corresponding drop flank of the square Pulse in response to the current flow passing through a second threshold value. The length of the square signal thus practically corresponds to the time from the leading end of the milk slug entering the measuring section to the trailing end of the slug leaving this section. On the assumption of a constant traveling speed of the milk slugs at least in the range of the lower milk flow threshold value, the width of the square pulse generated by Schmitt trigger 97 will directly correspond to the length of the milk slugs thus measured.

Specifically towards the end of a milking cycle, the milk slugs appear at steadily increasing intervals, as a result of which the square pulses generated by Schmitt trigger 97 will also appear at similarly increasing intervals. On the basis of the length of successive square pulses and of the intervals between successive pulses, low-pass 98 now acts to determine a variable average measured value. This Value appearing at the output of low-pass 98 corresponds to the actual milk flow, although this value is not fully conclusive as long as the actual traveling speed of the milk slugs is not taken into consideration. In view of the fact, however, that the milk flow at the end of a milking cycle has been found to be approximately invariable in the vicinity of the lower threshold value, the second Schmitt trigger 99 may be set to a first predetermined threshold value corresponding to the output signal of low-pass 98 in the presence of a milk flow of 0.2 kg/min at a predetermined speed. As a result, when the decreasing milk flow at the end of a milking cycle causes the measured value supplied by low-pass 98 to drop to below the input threshold value to which Schmitt trigger 99 has been set, the latter perform a switching operation to result in the appearance at its output 100 of a signal which may be used for any indicating or control functions, for instance for causing the pulsation to be shut down or the teat rubbers to be taken off. Since the representative length of the milk slugs can be measured very accurately it is possible, at least during the low milk flow periods in the milking cycle, to obtain a relatively accurate signal corresponding to the actual milk flow, and to generate a corresponding output signal when the milk flow drops to below a predetermined value. The output of the circuit thus supplies a simple Yes or No measuring signal.

Figure 1:
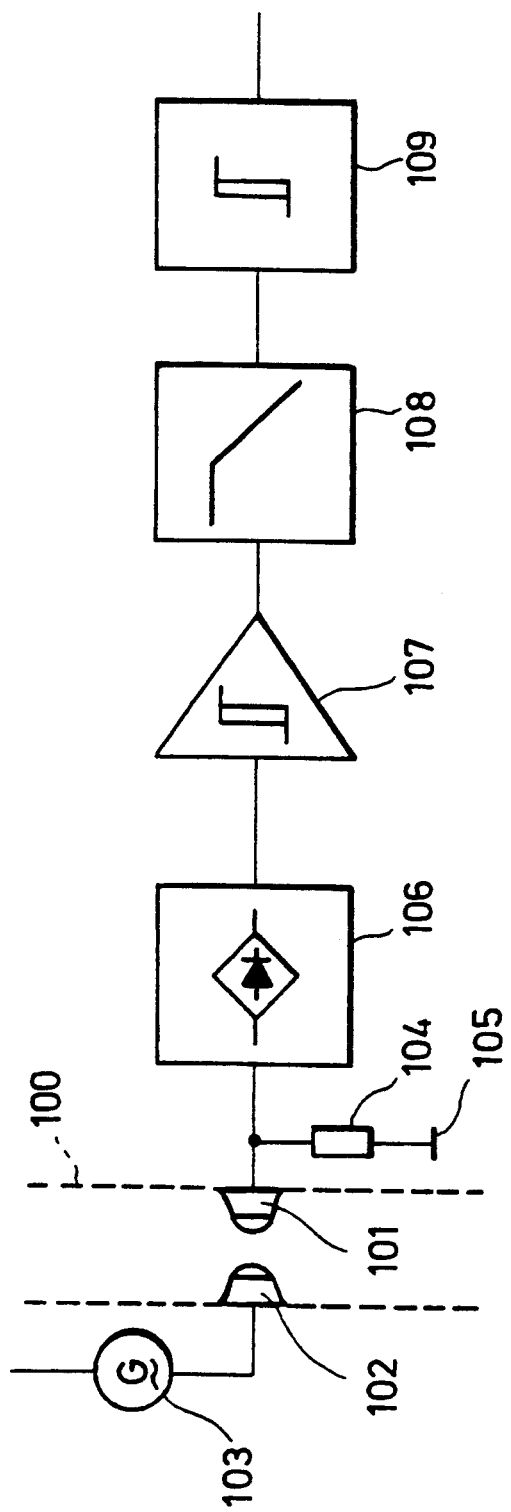
FIG. 1 shows a diagrammatic illustration of a milk flow indicator according to the invention functioning on the electric conductivity measuring principle.

FIG. 1 shows an embodiment similar to that of FIG. 2. A riser conduit section 100 is again provided with electrodes 101, 102. Electrode 102 has a AC voltage signal applied thereto by a AC voltage generator 103. The output of electrode 101 is connected to ground 105 through a resistor 104. The connection point of the output of electrode 101 and resistor 104 is connected to a rectifier 106 the output of which is applied to a Schmitt trigger 107, the output of the latter being again applied to a low-pass filter 108. The output of low-pass 108 is applied to the input of a further Schmitt trigger 109 acting to generate an output signal in response to the output signal supplied by low-pass 108 deviating from the pre-set input threshold value of Schmitt trigger 109. The circuit functions in the same manner as the one depicted in FIG. 2, with the exception that an AC current flows in the measuring section between the two electrodes 101, 102 when a conductive connection is established therebetween by a milk slug. The AC current appearing at electrode 101 is then converted into a DC voltage signal by rectifier 106, this signal being subsequently applied to low-pass 108 in a similar manner as described with reference to FIG. 2.

Figure 3:
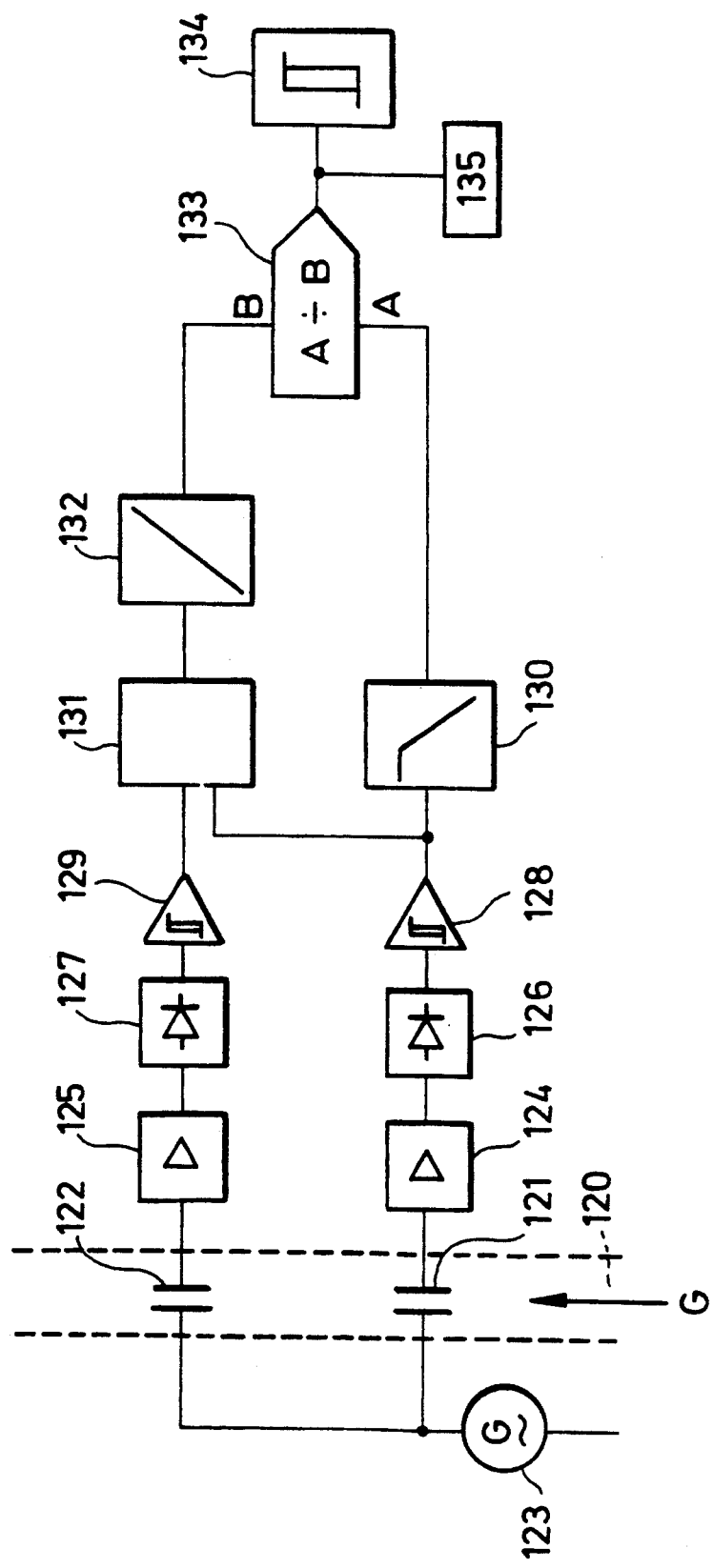
FIG. 3 shows a diagrammatic illustration of a milk flow indicator according to the invention functioning on the capacitive measuring principle, with simultaneous measuring of the milk slug travel speed.

Shown in FIG. 3 is a circuit embodiment capable of additionally determining the travelling speed of a milk slug as in the embodiment illustrated in FIGS. 10 and 11, and of thereby supplying a measuring signal directly corresponding to the actual milk flow. Provided within a riser conduit section 120 at locations axially spaced from one another are two measuring sections 121 and 122 functioning on the capacitive measuring principle. Each measuring section may thus be composed of two capacitor plates disposed opposite one another. The capacitor plates on the left in FIG. 3 are connected to an AC voltage generator 123. The capacitor plates on the righthand side of the drawing are each connected to a respective amplifyer 124 and 125. The outputs of the amplifyers are connected to respective rectifiers 126, 127 themselves again connected to respective Schmitt triggers 128 and 129. The output of Schmitt trigger 128 is applied to a low-pass filter 130, and at the same time to a first input of a pulse length measuring circuit 131. The output of the other Schmitt trigger 129 is applied to a second input of pulse length measuring circuit 131. The output of pulse length measuring circuit 131 is applied to a time-voltage converter 132. The output signal A of low-pass 130 is applied to a divider circuit 133 which also has the output signal B of time-voltage converter 132 applied thereto. The divider circuit 133 performs the division of the measuring signals A:B. The thus obtained output signal is already representative of the measuring value corresponding to the actual milk flow and may be used for determining the absolute value of the milk flow in consideration of the cross-sectional area of riser conduit section 120. In case of it being desired, however, to use the measuring apparatus as an indicator as in the embodiments described above with reference to FIGS. 1 and 2, the output of divider circuit 133 may be applied to a further Schmitt trigger 134 acting to supply a simple Yes or No indication in response to any deviation from a pre-set threshold value.

The described circuit functions as follows: When a milk slug travels upwards through riser conduit section 120 in the direction of arrow G, it has initially to pass through measuring section 121. As the milk slug enters the measuring section, Schmitt trigger 128 generates the rising flank of a square pulse which is applied to both low-pass 130 and pulse length measuring circuit 131 to thereby generate a start signal. When the length of the milk slug is shorter than the distance between the two measuring sections 121 and 122, Schmitt trigger 128 responds to the passage of the trailing end of the slug through measuring section 121 by generating the drop flank of the square pulse which is applied to low-pass 130. At the same time the drop flank is applied to the pulse length measuring circuit 131, which does not, however, alter the condition of the latter. When the leading end of the milk slug subsequently enters the second measuring section 122, Schmitt trigger 129 generates the rise flak of a square pulse which is applied to the second input of pulse length measuring circuit 131 to thereby terminate the time measuring operation. This results in the appearance at the output of pulse length measuring circuit 131 of a pulse the rise flank of which is determined by the rise flank of the pulse generated by Schmitt trigger 128, and the drop flank of which is determined by the rise flank of the pulse generated by Schmitt trigger 129. The length of the pulse at the output of pulse length measuring circuit 131 thus corresponds to the time interval from the entry of the milk slug into the first measuring section 121 to its entry into the second measuring section 122, i.e. to the time of travel over an accurately defined distance. Since the time is thus directly related to a predetermined distance, the signal supplied by time-voltage converter 132 directly defines the reciprocal value of the milk slug travel speed. Divider circuit 133 acts to divide the signals A applied thereto by low-pass 130 by the signals B applied thereto by time-voltage converter 132. The value appearing at the output directly represents the milk flow volume per time unit after multiplication with the cross-sectional area of riser conduit section 120. The described arrangement thus acts as a very simple measuring apparatus for the generation of desired indications on a display device 135. The measuring apparatus may additionally be used as an indicator by applying the output of divider circuit 133 to a further trigger 134 operable to supply an indicator or control signal in the form of a simple Yes or No decision in response to the milk flow rising above or dropping below a predetermined value.

With regard to the circuits of FIGS. 1 and 2 it has been explained that the signal appearing at the output of the respective low-pass filter 98 and 108, when multiplied with the cross-sectional area of the riser conduit and a milk slug travelling speed as measured in the range of lower milk flow rates and found to be substantially constant, will permit to obtain a very usefull measuring value for the actual milk flow in the range of lower milk flow rates. The thus determined value may be used in a very simple manner for obtaining a highly accurate milk flow value over the full range of milk flow rates by providing, as described with reference to FIG. 3, a second measuring section with corresponding measuring circuitry operable to determine the actual travel rate of each milk slug, and by multiplying the thus measured milk flow with a correction value p/q, wherein p is the actually measured travelling speed and q represents the previously measured and fixedly pre-set travelling rate in the low flow rate range.

Figure 4:
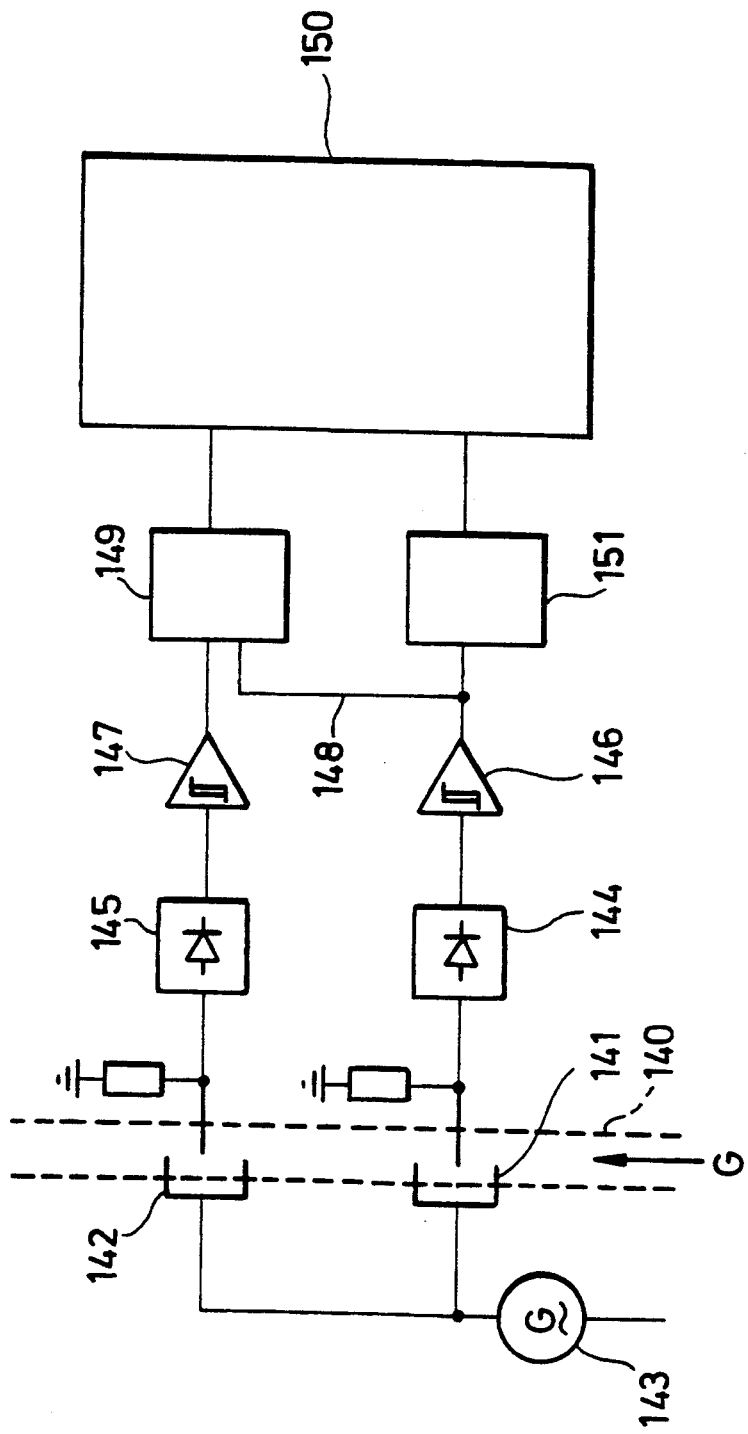
FIG. 4 shows a diagrammatic illustration of another embodiment of a milk flow measuring apparatus according to the invention.

The circuit depicted in FIG. 4 is similar to the one shown in FIG. 3, but functions on the electric conductivity measuring principle rather than on the capacitive measuring principle. In a riser conduit section 140, two measuring sections 141 and 142 are provided at an accurately predetermined distance from one another, each measuring section comprising two electrodes facing one another. The electrodes on the lefthand side of the riser conduit have an AC voltage applied thereto by an AC voltage generator 143. The electrodes on the righthand side of riser conduit 140 are grounded through respective resistors. The output signals of the electrodes are applied to Schmitt triggers 146 and 147 via respective rectifiers 144, 145. Schmitt trigger 146 responds to the passage of the leading end of a milk slug through first measuring section 141 by generating the rise flank of a pulse which is applied via connection 148 to one input of a pulse length measuring circuit 149. The entry of the leading end of the milk slug into second measuring section 142 causes Schmitt trigger 147 to also generate the rise flank of a square pulse to be applied to the second input of pulse length measuring circuit 149. This causes pulse length measuring circuit 149 to terminate the generation of a pulse which had been initiated via start connection 148. The length of this pulse is then applied to a microprocessor 150. Additionally applied to microprocessor 150 are the output pulses of a pulse length measuring circuit 151 acting to measure the lengths of the pulses generated by Schmitt trigger 146. Microprocessor 150 acts to process these data to result in an output signal defining the value for the absolute milk flow in consideration of the cross-sectional area of riser conduit section 140. On the other hand, microprocessor 150 may also act to generate a control signal in response to the milk flow rising above or dropping below a predetermined value.

The measuring circuitries shown in FIGS. 3 and 4 are useful for the implementation of milk flow measuring devices capable of measuring over the full range of milk flow rates, i.e. in a range of milk flow rates between 150 g/min and 9,000 g/min, the construction of such devices being extremely simple and effective to practically prevent the occurrence of additional vacuum losses.

Figure 18:
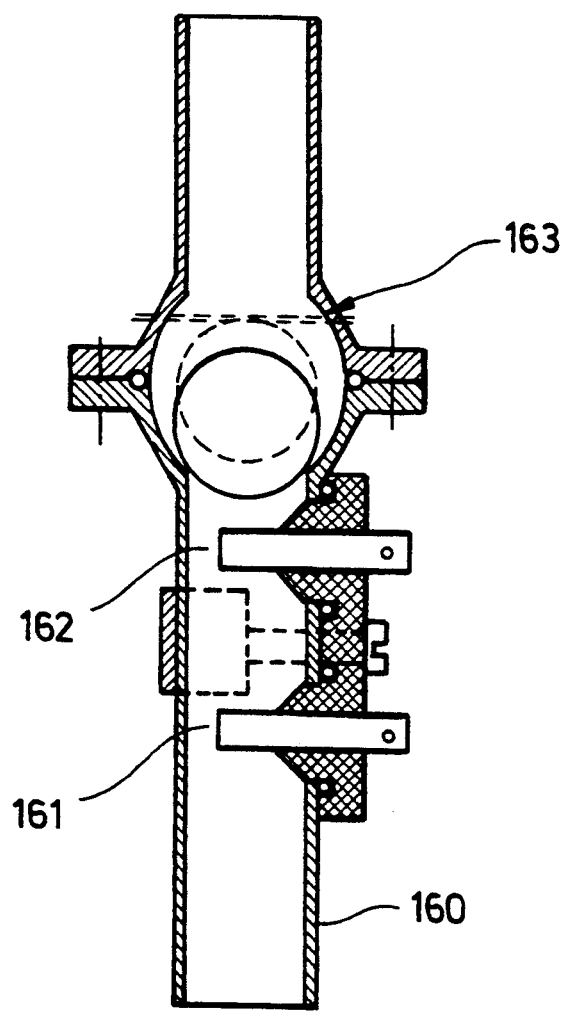
FIG. 18 shows a sectional view of a riser conduit section provided with a non-return valve above a pair of measuring sections.

As already explained above it may happen, particularly at the end of the milking cycle when the mass of individual milk slugs is steadily decreasing, that a milk slug traveling upwards in the riser conduit is completely hollowed out before it reaches the milk header, i.e. that the air supplied for conveying the milk completely penetrates the slug, causing it to disappear in the form of a liquid film flowing back along the walls of the conduit. The milk slug is thus no longer conveyed, its liquid mass flowing back on the walls of the riser conduit. Although even in this case the specific construction of the measuring sections is effective to prevent the backflow of the milk from being measured as the passage of a milk slug, the back-flowing milk will collect at a lower point, resulting in the passage of a milk slug formed of this same milk through the measuring section. This would then erroneously indicate a milk flow of a magnitude greater than the actual milk flow. For avoiding such erroneous measuring operation as far as possible, a preferred embodiment as shown in FIG. 18 provides the installation of a non-return valve 163 in a riser conduit 160 at a location above two measuring sections 161 and 162 provided in this example. In the present example, the non-return valve is a simple ball valve. In a construction of this type, if it happens that a milk slug were penetrated and thus destroyed after having passed the two measuring sections 161 and 162 and non-return valve 163, the latter would act to retain the back-flowing milk to thereby prevent it from again passing the measuring sections. The milk thus collected above non-return valve 163 would then be passed on along the riser conduit in the form of a milk slug of a greater mass formed by combination with the milk of the next slug arriving at this location.

A similar improvement is also obtained in the embodiment depicted in FIG. 10. In this embodiment, the measuring sections formed by electrodes 21 and 22 are disposed in the immediate vicinity of the highest point 165 of elbow 15. Any milk slugs starting to disintegrate only on arrival at this highest point 165 will therefore not flow back through the measuring sections, but will rather be drained directly into milk header 18, so that they are excluded from a repeated measuring operation. In this manner the accuracy of the measuring operation can be considerably improved, particularly in the range of low milk flow rates.

Figure 19:
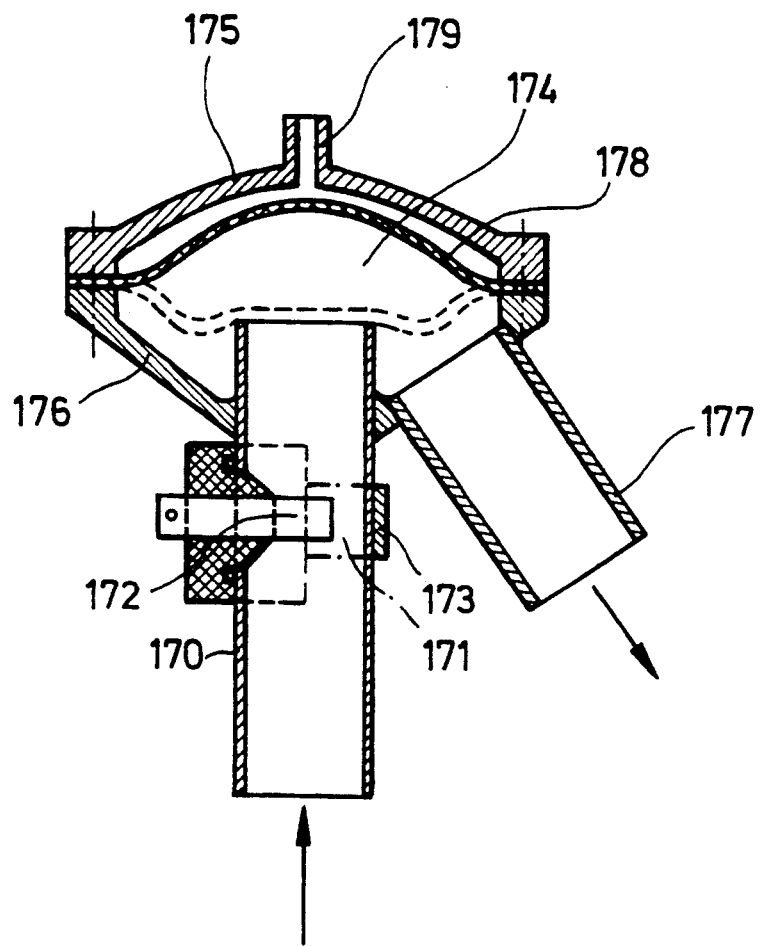
FIG. 19 shows a sectional view of a riser conduit including a measuring section and provided with a shut-off valve at its upper end.

When the milk flow drops to below the threshold value of 0.2 kg/min for the first time, which in the milk flow curve of FIG. 5 occurs at instant A, it is of course desirable to not only generate a corresponding optic or acoustic signal acting for instance to advise the operator of the end of the milking operation, because it frequently happens that the operator is unable to immediately act on such a signal, for instance when several cows are to be milked at the same time. The accurate indication of the end of the milking operation notwithstanding, this would result in that the milking. i.e. dry-milking, of the respective cow would continue for a certain period. This dry-milking process can be avoided by the device shown in FIG. 19. This FIGURE illustrates a riser conduit section 170 provided with a measuring section 171 between an electrode 172 and a counter-electrode 173. Immediately downstream of this measuring section, the riser conduit ends in an enclosed space 174 defined between a cup 176 surrounding the upper end of riser conduit 170 and a domed cap 175. Cup 176 is provided with a drain conduit 177 for draining the milk of successive slugs supplied via riser conduit 170 and diverted by the interior wall surface of cap 175. Clamped between the rims of cup 176 and cap 175 is a diaphragm 178 which in the course of the milking operation is retained in the upwards deflected position shown in solid lines in FIG. 19 by the vacuum applied to the interior of cap 175 through a Port 179. This permits the milk to flow from the end of riser conduit 170 into enclosed space 174 and to be drained therefrom through drain conduit 177.

The control signal generated by the indicator at the end of the milking operation may then be used for causing the vacuum applied to port 179 to be cancelled as by establishing communication of port 179 with ambient air. As a result of this control operation, the milking vacuum continuing to be applied to drain conduit 177 causes diaphragm 178 to be deformed to the shape illustrated by broken lines to thereby obturate the upper opening of riser conduit 170. This results in the teats being separated from the milking vacuum, permitting the milking appliance to be removed from the udder by an automatically acting device provided for this purpose.

In addition to the advantages already pointed out above, the measuring system according to the invention offers the particular advantage that the milk is supplied to the measuring section from below. In contrast to known conduit indicators, this feature permits a milk hose installation of relatively short length without any discontinuity, even in the case of high-line installations. This has a highly positive effect with regard to flow losses, particularly vacuum losses, as well as to the handling of the system as a whole. In the measuring system according to the invention, the response of the apparatus and the flow signal are moreover not significantly influenced by the characteristics of different milking systems, such as for instance continuous or intermittent air feed, synchronuous or alternating pulse operations and the like. The signal is not either influenced by differences of the electric conductivity of the milk, since the determination of the mass of the milk slugs is solely based on a simple Yes or No decision. The signal is moreover relatively uncritical with regard to deviations of the measuring system from a given, for instance vertical attitude as are liable to occur in practical use.

Although in the preceding reference has always been made to a riser conduit section, the use of the system is not restricted to milking installations with an overhead milk header. The system is rather also suitable for use in low-level milking installations as long as the milk conduit is provided at any suitable location with a short riser conduit section for the conveyance therethrough of the milk in the form of successive milk slugs.

The embodiments of the invention in which an exclusive property or privilege is claimed are defined as follows:

1. A method for measuring a flow of milk in a course of intermittent transport of extracted milk in a form of successive milk slugs through at least one riser conduit section, the steps comprising determining a value corresponding to a mass of each milk slug b sensing the length of each milk slug within said at least one riser conduit section at a spaced location from an interior wall of said at least one riser conduit section, and deriving a mean milk flow value therefrom by establishing a timing average for successive milk slugs in consideration of a predetermined slug travel rate.

2. The method according to claim 1, wherein the measured milk flow value is repeatedly compared to a pre-set second milk flow value constituting a threshold value, and generating a control signal in response to said measured milk flow value dropping below or rising above said pre-set milk flow value.

3. The method according to claim 2, wherein the time required for each milk slug to travel over a predetermined distance is measured, the thus determined time value being used for determining the mass of a milk slug on the assumption of a predetermined slug travel rate, to thereby establish the mean milk flow value.

4. A method for measuring a flow of milk in a course of intermittent transport of extracted milk in a form of successive milk slugs through at least one riser conduit section, the steps comprising measuring a transport speed of said milk slugs, and determining a value corresponding to a mass of each milk slug by sensing a length of each milk slug within said at least one riser conduit section at a spaced location from an interior wall of said at least one riser conduit section, and deriving a magnitude of milk flow therefrom by establishing a time average for successive milk slugs.

5. The method according to claim 4, including generating a control signal in response to the milk flow dropping below a predetermined value.

6. Apparatus for measuring a value corresponding to a mass of a milk slug in a course of intermittent transport of extracted milk in a form of successive milk slugs through at least one riser conduit section, comprising means defining a measuring section extending transversely of a direction of transport of said milk slug within said at least one riser conduit section at a location of said at least one riser conduit section, said measuring section extending between at least one of (1) two measuring points disposed opposite one another at respective spaced locations from an interior wall of said at least one riser conduit section and (2) a measuring point disposed at a spaced location from the interior wall of said at least one riser conduit section and the interior wall of said at least one riser conduit section, each measuring point within an interior of said at least one riser conduit section being spaced from the interior wall by a distance of about $d/4$, where d is the inner diameter of said at least one riser conduit section, said inner diameter of said at least one riser conduit section producing a nearly uniform flow of milk therethrough and between the ends of said at least one riser conduit section, and a measuring means for measuring a time interval required for a respective part of each milk slug to pass through said measuring section.

7. The apparatus according to claim 6, wherein said measuring section is established between an interior wall of said at least one riser conduit section acting as a first electrode and a second electrode formed by a tip end of a probe mounted on the interior wall of said at least one riser conduit section in an electrically insulated manner and projecting into the interior of said at least one riser conduit section.

8. The apparatus according to claim 7, wherein said tip end is an edge of a metal plate projecting into the interior of said at least one riser conduit section, said edge extending in a longitudinal direction of said at least one riser conduit section.

9. The apparatus according to claim 7, wherein the tip end of the electrode facing towards the interior wall of said at least one riser conduit section is spaced from said interior wall by a distance of between about $\frac{1}{4}$ d and $\frac{3}{4}$ d, d designating the internal diameter of said riser conduit section.

10. The apparatus according to claim 6, wherein said measuring section is established between two electrodes mounted in electrically insulated manner at opposite locations on the interior wall of said at least one riser conduit section and projecting into the interior of said at least one riser conduit section.

11. The apparatus according to claim 10, wherein within said at least one riser conduit section, said electrodes extend through the wall of said at least one riser conduit section and are electrically insulated up to a distance of about $d/4$ from said interior wall, d designating the internal diameter of said riser conduit.

12. The apparatus according to claim 10, wherein said electrodes are spaced by a distance a, wherein $a \leq d/2$ from one another.

13. The apparatus according to claim 6, wherein said measuring section is designed for measuring electric conductivity for at least one of a capacitive measuring function and an optical absorption measuring function.

14. The apparatus for measuring the milk flow according to claim 6, wherein there is provided a component for establishing a mean time from the time values measured for successive milk slugs, and a threshold value comparator for comparing the output signal obtained from said component to a pre-set second signal value constituting a threshold value obtained by calibration.

15. The apparatus for measuring the milk flow according to claim 6, wherein there is provided a component for establishing a mean time from the time values measured for successive milk slugs and for determining a milk flow value in consideration of the cross-sectional area of said at least one riser conduit section and of a predetermined milk slug travel rate.

16. The apparatus according to claim 6, wherein at the location of said at least one riser conduit section within said at least one riser conduit section there is provided first and second measuring sections both extending transversely of the direction of transport of said milk slugs at a spaced location from said first measuring section in a longitudinal direction of said at least one riser conduit section, and wherein said measuring means includes a component for determining the travel rate of each milk slug by measuring a time difference between the passage of each milk slug through said first and second measuring sections.

17. The apparatus according to claim 16, wherein said second measuring section is of the same construction as said first measuring section.

18. The apparatus according to claim 16, wherein at least one of said first measuring section and said second measuring section is disposed immediately upstream of an elbow portion of said riser conduit section opening into a milk header.

19. The apparatus according to claim 16, including a backflow preventer in the milk transport conduit immediately downstream of at least one of said first measuring section and said second measuring section.

20. The apparatus according to claim 16, including a component for generating a control signal in response to the measured milk flow value dropping below a predetermined milk flow value.

21. The apparatus according to claim 20, including a vacuum-operated shut-off valve adapted to close in response to said control signal.

22. The apparatus according to claim 21, wherein said shut-off valve is a diaphragm valve.

* * * * *

UNITED STATES PATENT AND TRADEMARK OFFICE
CERTIFICATE OF CORRECTION

PATENT NO. : 5,245,946

DATED : September 21, 1993

INVENTOR(S) : Tilman HOEFELMAYR, et al

It is certified that error appears in the above-identified patent and that said Letters Patent is hereby corrected as shown below:

Column 19, line 21; replace "slug b" with ---slug by---.

Signed and Sealed this

Twenty-second Day of March, 1994

Attest:

BRUCE LEHMAN

Attesting Officer     Commissioner of Patents and Trademarks